(12) United States Patent
Ueda (10) Patent No.: US 9,812,173 B2
(45) Date of Patent: Nov. 7, 2017

(54) SIGNAL RECORDING APPARATUS, CAMERA RECORDER, AND SIGNAL PROCESSING SYSTEM

(71) Applicant: Panasonic Corporation, Osaka (JP)

(72) Inventor: Hisataka Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/186,254

(22) Filed: Feb. 21, 2014

(65) Prior Publication Data

US 2015/0078730 A1 Mar. 19, 2015

(30) Foreign Application Priority Data

Sep. 19, 2013 (JP) ................. 2013-193842

(51) Int. Cl.
| | | |
|---|---|---|
| H04N 9/80 | (2006.01) |
| G11B 27/30 | (2006.01) |
| G06F 17/30 | (2006.01) |
| G11B 27/00 | (2006.01) |
| H04N 5/77 | (2006.01) |
| H04N 9/806 | (2006.01) |
| H04N 9/82 | (2006.01) |
| G11B 27/034 | (2006.01) |

(52) U.S. Cl.
CPC ........ *G11B 27/309* (2013.01); *G06F 17/3082* (2013.01); *G11B 27/00* (2013.01); *G11B 27/034* (2013.01); *H04N 5/772* (2013.01); *H04N 9/8063* (2013.01); *H04N 9/8205* (2013.01)

(58) Field of Classification Search
CPC ..... H04N 5/76; G06F 17/30265; G11B 27/28; G11B 27/322
USPC ........................................... 386/241
See application file for complete search history.

(56) References Cited

U.S. PATENT DOCUMENTS

| | | | |
|---|---|---|---|
| 2002/0087565 A1* | 7/2002 | Hoekman et al. ............ 707/100 |
| 2003/0002715 A1 | 1/2003 | Kowald |
| 2008/0306995 A1* | 12/2008 | Newell .............. G06F 17/30265 |
| 2009/0097816 A1* | 4/2009 | Nakate ................... G11B 27/28 |
| | | | 386/278 |

(Continued)

FOREIGN PATENT DOCUMENTS

| | | |
|---|---|---|
| JP | 2001-273505 A | 10/2001 |
| JP | 2001-292411 A | 10/2001 |
| JP | 2013-229808 A | 11/2013 |

*Primary Examiner* — Thai Tran
*Assistant Examiner* — Jose Mesa
(74) *Attorney, Agent, or Firm* — Renner Otto Boisselle & Sklar, LLP (57) ABSTRACT

A signal recording apparatus configured to classify video/sound materials is provided with a reduced operational burden. A metadata generator is configured to generate recorded metadata which is metadata recorded with an AV signal. A classification determinator is configured to determine, upon receipt of the recorded metadata, which playlist a portion of the AV signal corresponding to the recorded metadata is classified into by referring to a classification database storing a classification rule and to output classification information indicating a determination result. A playlist generator is configured to generate a playlist according to the classification information. A recorder is configured to record the AV signal, the recorded metadata, and the playlist on a recording medium.

9 Claims, 7 Drawing Sheets

(56) References Cited

U.S. PATENT DOCUMENTS

| | | | |
|---|---|---|---|
| 2009/0112933 A1* | 4/2009 | Kato et al. | 707/104.1 |
| 2010/0272417 A1* | 10/2010 | Nagasawa et al. | 386/97 |
| 2010/0284667 A1* | 11/2010 | Yahata | G11B 27/034 |
| | | | 386/241 |

* cited by examiner

```
<Shot>
ShotName:0000
ShotMark:ON
StartTime:"10:12:13"

<TextMemo List>
10, "Note:Comment"
40, "Note:important"

<FocalLength List>
10, 300
50, 210
```

FIG. 3

```
<PlayList>
Goal

<Item List>
"0000", "10:12:13", 100
"0001", "11:09:08", 200
```

FIG. 4

| CLASSIFICATION CONDITION | | CLASSIFICATION INFORMATION | |
|---|---|---|---|
| DETERMINATION INFORMATION | DETERMINATION CONDITION | CLASSIFICATION PLAYLIST INFORMATION | ITEM TYPE |
| ShotMark | ON | PL#1 | Type1 |
| TextMemo | TM_A | PL#2 | Type2 |
| FocalLength | >100 | PL#3 | Type2 |
| StartTime | 10:00:00 | PL#4 | Type1 |
| FaceDetection | Mr.U | PL#6 | Type2 |
| Else | (none) | PL#10 | Type1 |

| CLASSIFICATION CONDITION | | CLASSIFICATION INFORMATION | |
|---|---|---|---|
| DETERMINATION INFORMATION | DETERMINATION CONDITION | CLASSIFICATION PLAYLIST INFORMATION | ITEM TYPE |
| Audio Trigger | AudioIn | PL#21 | Type2 |
| Else | (none) | PL#22 | Type1 |

FIG. 8A

| CLASSIFICATION CONDITION | | CLASSIFICATION INFORMATION | |
|---|---|---|---|
| DETERMINATION INFORMATION | DETERMINATION CONDITION | CLASSIFICATION PLAYLIST INFORMATION | ITEM TYPE |
| TextMemo | GOAL | PL#S1 | Type2 |
| TextMemo | FOUL | PL#S1 | Type2 |
| TextMemo | KICK | PL#S1 | Type2 |
| StartTime | 12:55:00-13:05:00 | PL#S2 | Type1 |

FIG. 8B

| CLASSIFICATION CONDITION | | CLASSIFICATION INFORMATION | |
|---|---|---|---|
| DETERMINATION INFORMATION | DETERMINATION CONDITION | CLASSIFICATION PLAYLIST INFORMATION | ITEM TYPE |
| Face Detection | PRIME MINISTER F | PL#N1 | Type2 |
| Voice Detection | PRIME MINISTER F | PL#N1 | Type2 |
| Focal Length | >150 | PL#N1 | Type2 |

FIG. 9

SIGNAL RECORDING APPARATUS, CAMERA RECORDER, AND SIGNAL PROCESSING SYSTEM

CROSS-REFERENCE TO RELATED APPLICATION

This application claims priority to Japanese Patent Application No. 2013-193842 filed on Sep. 19, 2013, the entire disclosure of which is incorporated by reference herein.

BACKGROUND

The present disclosure relates to a signal recording apparatus configured to classify video/sound materials based on recorded metadata.

In recent years, an apparatus has been generally employed, which is configured to record files of video data or audio data on a randomly-accessible recording medium such as an optical disc or a semiconductor memory. For example, in broadcast stations and film production companies, editing apparatuses each including such a recording medium are used for video editing. For such video editing, e.g., video/sound materials are recorded on the recording medium with metadata, i.e., additional information on the video/sound materials, and the metadata is used to improve efficiency of, e.g., editing.

Given this backdrop, Japanese Unexamined Patent Publication No. 2001-292411 discloses the technique for recording metadata as additional information on video pictures and sound (video/sound materials) recorded on a recording medium. A recording apparatus includes a recorder configured to record video pictures and sound on the recording medium, and a multiplexor configured to multiplex video/audio data and metadata. For example, input metadata is multiplexed with video/audio data by the multiplexor, and is recorded on the recording medium with the metadata being associated with the video/audio data. Thus, the time for searching desired video data can be shortened.

Japanese Unexamined Patent Publication No. 2001-273505 discloses a classification system provided for analyzing a face image of a person and configured to classify an image according to the size and position of a face in an image. The classification system classifies an image based on, e.g., metadata on the face size and a predetermined editing template. Thus, an image can be efficiently classified based on the metadata.

SUMMARY

According to the present disclosure, a signal recording apparatus capable of classifying video/sound materials can be provided with a reduced operational burden.

A signal recording apparatus of the present disclosure includes a metadata generator configured to generate recorded metadata which is metadata recorded with an AV signal containing at least one of video or audio; a classification determinator configured to determine, upon receipt of the recorded metadata, which playlist a portion of the AV signal corresponding to the recorded metadata is classified into by referring to a classification database storing a classification rule and to output classification information indicating a determination result; a playlist generator configured to generate, according to the classification information, a playlist for the AV signal; and a recorder configured to record the AV signal, the recorded metadata, and the playlist on at least one recording medium.

The signal recording apparatus of the present disclosure is useful for reducing an operational burden and automatically classifying video/sound materials.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

First Embodiment

A first embodiment will be described below with reference to FIGS. 1-8. Note that a set of a series of video data between the start of recording and the end of recording and additional information thereon is hereinafter referred to as a "shot." The additional information includes information for managing video data and metadata.

[1-1. Configuration]

Figure 1:
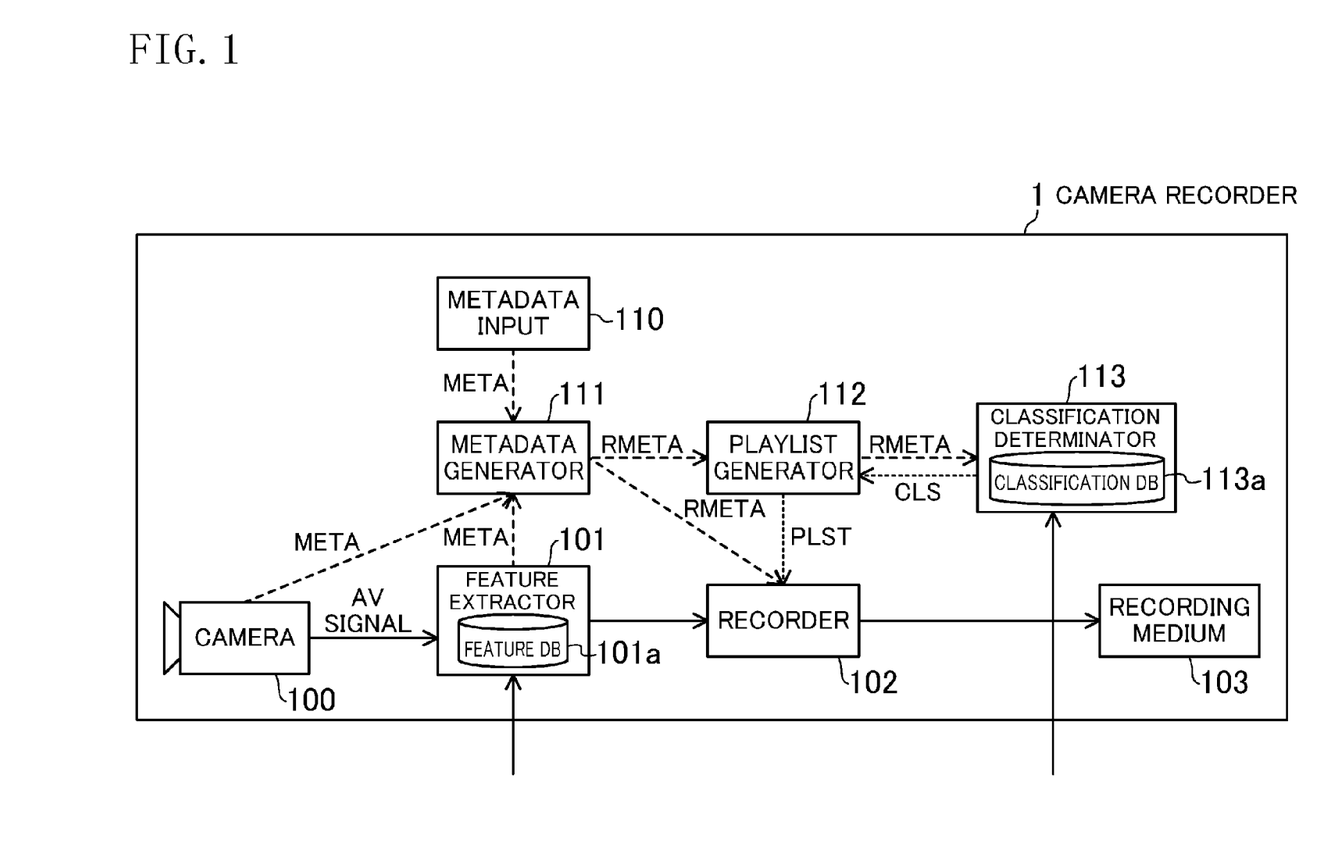
FIG. 1 is a block diagram illustrating a configuration of a camera recorder of a first embodiment.

FIG. 1 is a block diagram illustrating a configuration of a camera recorder of the first embodiment. A camera recorder 1 includes a camera 100, a feature extractor 101, a recorder 102, a recording medium 103, a metadata input 110, a metadata generator 111, a playlist generator 112, and a classification determinator 113. A signal recording apparatus of the present embodiment includes a metadata generator 111, a classification determinator 113, a playlist generator 112, a feature extractor 101, and a recorder 102.

The camera 100 is configured to image an object, convert the object image into a video signal as an AV signal, and output the video signal. Configuration and operation of the camera 100 are the same as those of a camera used for a typical camera recorder. Moreover, the camera 100 is configured to provide the metadata generator 111 with imaging information (e.g., focal distance information) on conditions for forming an object image as metadata META. Note that the camera 100 may be configured to output an audio signal in addition to a video signal, or to output only an audio signal.

The metadata input 110 is configured to receive an input from a user and provide the metadata generator 111 with the input metadata META. For example, metadata META may be input to the metadata input 110 in such a manner that a character(s) is entered using a keyboard or that a button to which a particular character string (e.g., "Good") is assigned is pressed to input the character string. Since these methods for inputting metadata META have been generally widely known, the detailed description thereof will not be made.

The feature extractor 101 is configured to extract a feature of the AV signal input from the camera 100. The feature extractor 101 extracts the feature (e.g., detects a scene change or recognizes a face) from the input video signal to output a video signal to the recorder 102 and to output, as metadata META, feature information indicating an extraction result to the metadata generator 111. Upon receipt of an audio signal, the feature extractor 101 extracts a feature of the audio signal. The feature extractor 101 includes a feature database 101a configured to store reference feature data used for comparison with video contained in the video signal or audio contained in the audio signal. Examples of the reference feature data include features of a video picture of a face and frequency characteristics of a voice. The feature extractor 101 determines whether or not the video contained in the video signal contains a predetermined feature such as a face image of a particular person. Alternatively, the feature extractor 101 determines whether or not the audio contained in the audio signal contains a predetermined feature such as a voice of a particular person. In these cases, the feature information output from the feature extractor 101 is for identifying the predetermined feature used for determination of the feature extractor 101 and a portion of the AV signal containing the predetermined feature. Note that the reference feature data stored on the feature database 101a can be updated from the outside of the camera recorder 1.

The metadata generator 111 is configured to generate, from the input metadata META, metadata RMETA (hereinafter referred to as "recorded metadata RMETA") recorded with the AV signal. The metadata META is supplied from the camera 100, the metadata input 110, and the feature extractor 101. The metadata generator 111 provides the playlist generator 112 and the recorder 102 with the recorded metadata RMETA. The process for generating the recorded metadata RMETA will be described in detail later.

In the present embodiment, the followings are used as examples of the metadata: "ShotMark," "TextMemo," "FocalLength," and "StartTime."

The "ShotMark" is metadata for marking a shot as "ON" or "OFF." For example, a significant shot is marked as the "ShotMark" being "ON" so that such a shot can be distinguished from other shots.

The "TextMemo" is metadata serving as a note for video data, and an optional character sting is set therefor.

The "FocalLength" is metadata on a focal distance in the camera 100, and, e.g., a numerical value in millimeters is set therefor.

The "StartTime" is metadata on a start time of recording of video data of each shot, and, e.g., a character string or a count value from a particular time is set therefor. In the present embodiment, a character string is set for the "StartTime." For example, a time of 10:12 and 13 seconds is set as a character string of "10:12:13."

The playlist generator 112 is configured to generate, for the AV signal, a playlist PLST based on the recorded metadata RMETA supplied from the metadata generator 111 and later-described classification information CLS transmitted from the classification determinator 113. The playlist is a list of play items. Each play item is a single entry when the AV signal is reproduced, and contains video data and reproduced section information (e.g., a reproduction start time and a reproduced section length). For example, a reproduction apparatus reproduces the play items of the playlist in order. Since the method for generating and managing a playlist or a playlist file has been generally widely known, the detailed description thereof will not be made. Note that the process for generating a playlist file will be described in detail later.

The playlist generator 112 provides the classification determinator 113 with the recorded metadata RMETA, and the classification information CLS is supplied from the classification determinator 113 in return.

The classification determinator 113 is configured to determine, based on the recorded metadata RMETA supplied from the metadata generator 111 via the playlist generator 112, the classification information CLS and provide the playlist generator 112 with the classification information CLS. The classification information is identification information for classifying video data or audio data. The classification determinator 113 includes a classification database 113a configured to store classification rules. The classification database 113a can be updated from the outside of the camera recorder 1. Based on, e.g., the classification information, the playlist generator 112 determines a playlist to which video data or audio data is added (i.e., associated). In this process, video data or audio data is classified using playlists.

The recorder 102 is configured to convert the video signal provided from the camera 100 via the feature extractor 101 into video data and record the video data on the recording medium 103 as a video file. The recorder 102 may optionally convert the video signal into the video data by compression coding. Examples of a compression coding method include widely-used moving picture experts group-2 (MPEG-2), MPEG-4 advanced video coding (MPEG-4/AVC), and society of motion picture and television engineers 314M (SMPTE-314M such as DV-Based 25M) which is one of standards of industrial digital video tape recorders (VTRs). In the present embodiment, any types of compression coding are applicable. For example, in the case where a sufficient recoding capacity can be ensured in the recording medium 103, the compression coding is not necessarily performed for the video signal. Since the method for recording compression-coded video data or uncompressed video data as a file has been generally widely known, the detailed description thereof will not be made.

In the case where the audio signal is provided, the recorder 102 converts, as in the case where the video signal is provided, the audio signal into audio data, and records the audio data on the recording medium 103 as an audio file. The audio signal may be converted into compression-coded audio data or uncompressed audio data. The audio data is recorded on the recording medium 103 as an audio file. Since the method for recording an audio signal has been generally widely known, the detailed description thereof will not be made.

The recording medium 103 is optionally managed by, e.g., a file system. Since the method for recording video data or audio data as a file has been generally widely known, the detailed description thereof will not be made. Note that the recording medium 103 may be built into the camera recorder 1, or may be configured to be detachable from the camera recorder 1. In the case where the recording medium 103 is detachable, the camera recorder 1 may include a slot(s) for detaching the recording medium 103.

The recorder 102 records the supplied recorded metadata RMETA such that the recorded metadata RMETA associates with the video data or the audio data. For example, a management information file containing the recorded metadata RMETA and a playlist file indicating the playlist PLST are recorded on the recording medium 103 together with the video data or the audio data.

Figure 2:
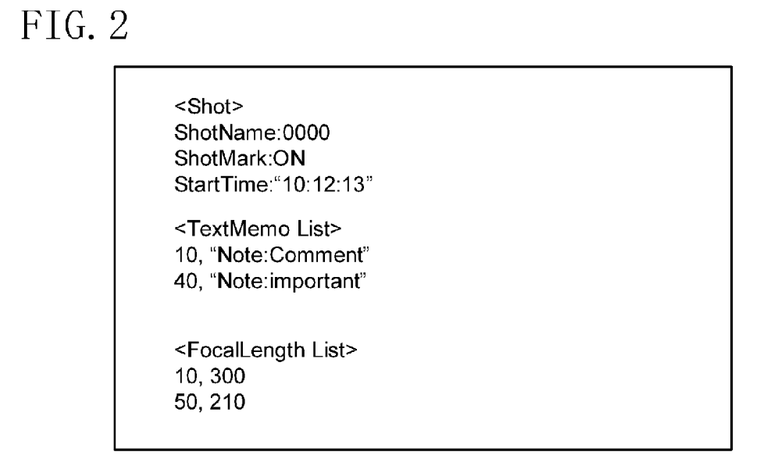
FIG. 2 illustrates an example of a management information file.

FIG. 2 illustrates an example of the management information file. The management information file contains information for managing a shot such as the recorded metadata. The management information file may be recorded as, e.g., a file in a text format, and may be in a comma separated value (CSV) format in which each field is separated by a comma or in the format in which a character string representing an item (tag) is provided with ": (colon)" and a value for the item. That is, when the recorded metadata RMETA is recorded as the management information file, the recorder 102 converts, e.g., each element (i.e., the item and the value therefor) of the recorded metadata RMETA into a character string to generate a text file.

In the example of FIG. 2, the management information file is divided into areas by tags of "<Shot>," "<TextMemo List>," and "<FocalLength List>." This is because the types of metadata attached to different targets can be, for the sake of convenience, distinguished from each other and be easily managed.

In the area of "<Shot>," metadata targeted for a shot and data required for content management are recorded. For example, "ShotName" indicates the name of a shot, and any character string can be set therefor. Moreover, "ShotMark" and "StartTime" are the types of metadata described above. These types of metadata are converted into character strings as illustrated in FIG. 2, and are recorded as a file.

The area of "<TextMemo List>" is the area where the metadata TextMemo is recorded. Since the metadata TextMemo is targeted for a point in video data (not targeted for a shot), a plurality of data pieces are recorded in a single shot. In this area, an offset from a starting point of a shot and a value for metadata (i.e., a character string) are recorded in this order. In the example of FIG. 2, information recorded in two lines in the area of "<TextMemo List>" indicates that two pieces of the metadata TextMemo are recorded in a shot. In the example of FIG. 2, the offset is represented by the number of frames.

The area of "<FocalLength List>" is the area where the metadata FocalLength is recorded. Since the metadata FocalLength is targeted for a point in video data (not targeted for a shot), a plurality of data pieces are recorded in a single shot. In this area, an offset from a starting point of a shot and a value for metadata (i.e., a focal distance) are recorded in this order.

Figure 3:
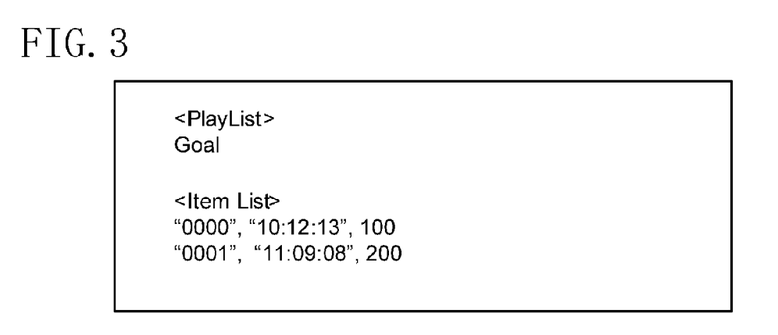
FIG. 3 illustrates an example of a playlist file.

FIG. 3 is an example of the playlist file. In the example of FIG. 3, the playlist file is divided into areas by tags of "<PlayList>" and "<Item List>." In the area of "<PlayList>," metadata targeted for a playlist is recorded. In this area, e.g., the name of the playlist is recorded. In FIG. 3, the name of the playlist is "Goal."

In the area of "<Item List>," information on play items is recorded. The information on play items contains, e.g., information on a shot to which each play item refers and reproduced section information (e.g., a starting point and a section length). Moreover, in this area, information on a plurality of play items is recorded. Thus, the information on play items is recorded in the CSV format in which each field is separated by a comma. Further, a single play item is recorded per line.

In the area of "<Item List>" illustrated in FIG. 3, information on each play item contains "ShotName," "StartTime," and the section length in this order. Moreover, in the area of "<Item List>" illustrated in FIG. 3, information is recorded in two lines, i.e., information on two play items is recorded.

The name of the shot to which the play item refers is represented by "ShotName." The reproduction start time of the play item is represented by "StartTime." The section length is the section length (i.e., duration) of the play item. For example, the number of frames from "StartTime" is set for the section length. For example, the information in the first line indicates that the play item refers to a shot named "0000" and that a hundred frames are reproduced starting at 10:12 and 13 seconds.

In the present embodiment, the recorder 102, the metadata generator 111, the playlist generator 112, and the classification determinator 113 are implemented by a microcomputer, a memory thereof, and a program running on the microcomputer. Moreover, the feature extractor 101 and the camera 100 are implemented by, e.g., a hardware module or a signal computing device and a program for controlling such devices.

[1-2. Camera Recorder Processes]

The camera recorder 1 performs each of the following processes: a recording process, a feature extraction process, a metadata generation process, a classification determination process, a playlist generation process, and a metadata recording process. Each process will be described in detail below. In the description below, suppose that the camera 100 outputs a video signal.

[Recording Process]

First, the basic recording process of the camera recorder 1 will be described. A user instructs, via an operator (not shown in the figure), the camera recorder 1 to start/end recording. For example, when recording is stopped, the user instructs the camera recorder 1 to start recording by pressing a recording start/end button of the operator. Such a recording start instruction is transmitted to the recorder 102, and the recorder 102 starts recording, e.g., compression-coded video data. On the other hand, while recording is being performed, the user instructs the camera recorder 1 to end recording by pressing the recording start/end button. Such a recording end instruction is transmitted to the recorder 102, and the recorder 102 stops recording, e.g., compression-coded video data. The recording process of the camera recorder 1 is similar to that of a generally-used camera recorder.

[Feature Extraction Process]

The feature extractor 101 detects, e.g., a face of a particular person from the video signal, and provides the metadata generator 111 with a detection result as the metadata META. For example, the feature extractor 101 compares between a face image detected from the video signal and the reference feature data stored on the feature database 101a to verify matching therebetween, thereby identifying a person in a video picture. For example, a group of feature points of a face image is used as the reference feature data. The reference feature data associated with a person name is stored on the feature database 101a. Since a face detection process has been generally widely known, the detailed description thereof will not be made.

The detection result of the feature extractor 101 is processed as the metadata TextMemo in the metadata generator 111. Upon receipt of the feature extraction result, the metadata generator 111 sets, e.g., a character string of "FaceDetection: 950, 460, Mr.U" for the metadata TextMemo. The "FaceDetection" is a name (tag) indicating that the metadata TextMemo is information on face detection result. The name is followed by coordinates (i.e., a horizontal pixel position and a vertical pixel position) and the name of a detected person. That is, in this example, the detection result of the feature extractor 101 shows that the face of a person named "Mr.U" is detected at a horizontal pixel position of "950" and a vertical pixel position of "460."

In the case of face detection, some of the feature extraction results are optionally left out in the metadata generator 111. This is because the feature extraction result for every video frame is provided in the case where the face detection process is performed for each video frame during shooting of the same person. For example, a point of change in feature extraction result (e.g., a change in person to be detected and a change in coordinates) may be detected, and only a change point may be processed as the recorded metadata RMETA.

[Metadata Generation Process]

The metadata generator 111 generates the recorded metadata RMETA from the input metadata META (one or more pieces of metadata META). The metadata generator 111 determines the target to which the metadata META is attached, and then sorts out the metadata META to determine the recorded metadata RMETA.

The process for determining the metadata attachment target may be performed as follows. Generally, the metadata attachment target is determined according to the definition or contents of the metadata item. For example, since the metadata ShotMark and the metadata StartTime are information on the whole recorded section, the metadata ShotMark and the metadata StartTime are attached to a shot. Moreover, since, e.g., the metadata TextMemo and the metadata FocalLength are information on a particular point (e.g., a video frame or a time) in video data, the metadata TextMemo and the metadata FocalLength are attached to an optional point in a shot (video data). For such a process, e.g., a table of attachment targets each set for a corresponding one of the metadata items is prepared in advance. Upon receipt of the metadata META, the metadata generator 111 may determine the attachment target with reference to the attachment target table.

The process for sorting out and determining the recorded metadata may be performed as follows. For example, the metadata generator 111 optionally leave out some of pieces of the input metadata META to generate the recorded metadata RMETA. This is because of the following reason. In the case where many pieces of the metadata META are input, recording of all metadata pieces results in too many pieces of the recorded metadata RMETA. Thus, there is a possibility that user searchability and user convenience are lowered.

For example, the metadata ShotMark is attached to a shot. Suppose that a user inputs both of "ON" and "OFF" for the same shot via the metadata input 110. In this case, both of "ON" and "OFF" cannot be attached to the same shot. Thus, in the present embodiment, the metadata generator 111 adopts the later-input data.

Moreover, e.g., the metadata FocalLength is dynamically updated following operation of the camera 100. In the case where the camera 100 is configured to transmit the metadata FocalLength every time a value for metadata FocalLength is updated, when the camera 100 is slowly operated, pieces of the metadata FocalLength are often transmitted to the metadata generator 111 such that values therefor are slightly different from each other. In this case, the metadata generator 111 may check that the metadata FocalLength is not transmitted for a certain period of time, and then generate the recorded metadata RMETA using the latest value for metadata FocalLength.

[Classification Determination Process]

Upon receipt of the recorded metadata RMETA from the metadata generator 111 via the playlist generator 112, the classification determinator 113 performs the classification determination process. That is, the classification determinator 113 refers, for the supplied recorded metadata RMETA, to the classification rules stored on the classification database 113a to acquire the classification information CLS, and provides the metadata generator 111 with the classification information CLS.

Figure 4:
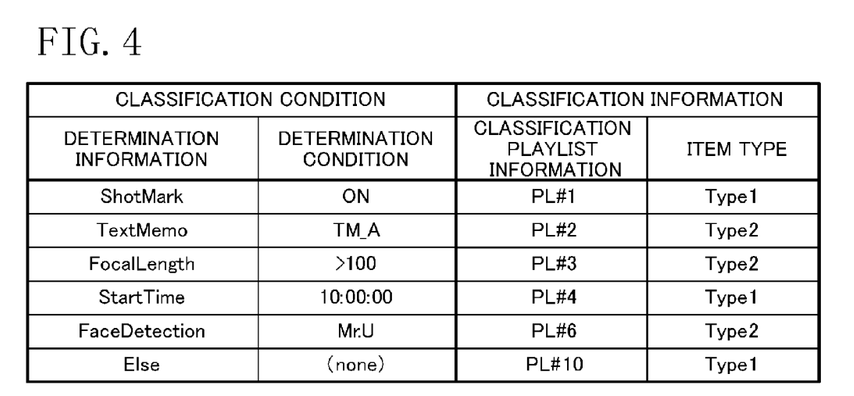
FIG. 4 illustrates an example of classification rules.

FIG. 4 illustrates an example of the classification rules stored on the classification database 113a. The classification rules are rules used for determining classification information based on recorded metadata.

Referring to FIG. 4, the classification rules include classification conditions and classification information. The classification conditions are for determining the classification information based on the recorded metadata, and include determination information and determination conditions. The determination information indicates the items for each of which the classification is determined, and the recorded metadata and other control information are set as the determination information. The other control information includes information indicating that there is no determination information or that the determination information indicates items other than the already-described items. For example, in the example of FIG. 4, "Else" indicates that the determination information indicates the items other than the already-described items. Each determination condition is for a corresponding one of the items of the determination information.

The classification information is identification information for which an association is established when the classification conditions are satisfied, and includes classification playlist information and item types. Such identification information is used for the playlist generation process. The classification playlist information serves as identifiers of the playlist. For example, a playlist number or name (in the example of FIG. 4, "PL#1" etc.) may be set for the classification playlist information. The item type indicates a type for generating the playlist. Examples of the item type include the case (item type Type1) where the entirety of a shot is added to a playlist as a play item, and the case (item type Type2) where a section before and after an attachment point of the recorded metadata is added to a playlist. The item type is determined according to the recorded metadata attachment target. That is, the item type Type1 is set when the recorded metadata attachment target is a shot, whereas the item type Type2 is set when the recorded metadata attachment target is a particular point in video data.

Since there is no recorded metadata for the determination information at the last line of the table of the classification rules of FIG. 4 (i.e., "Else"), the item type Type1 may be set. The determination condition "(none)" for the determination information "Else" in FIG. 4 indicates that no determination condition exists.

The case where the classification rules of FIG. 4 are used will be described as an example of the classification determination process. Suppose that the metadata ShotMark set to "ON" is received by the classification determinator 113 as the recorded metadata RMETA. According to the classification rules of FIG. 4, the classification determinator 113 determines the playlist number PL#1 and the item type Type1 as the classification information CLS. This is because the classification condition at the first line of the table of FIG. 4 is satisfied. If the classification condition at the first line of the table of FIG. 4 is not satisfied, the classification determinator 113 checks whether or not any of the classification conditions at the subsequent lines of the table is satisfied.

If the metadata TextMemo set to a character string of "TM_A" is received by the classification determinator 113 as the recorded metadata RMETA, the classification condition at the second line of the table of FIG. 4 is satisfied, and therefore the classification determinator 113 determines a playlist number PL#2 and the item type Type2 as the classification information CLS. If the metadata FocalLength set to a value exceeding 100 is received by the classification determinator 113 as the recorded metadata RMETA, the classification condition at the third line of the table of FIG. 4 is satisfied, and therefore the classification determinator 113 determines a playlist number PL#3 and the item type Type2 as the classification information CLS. If the metadata StartTime set to a time of 10:00 and zero second or thereafter is received by the classification determinator 113 as the recorded metadata RMETA, the classification condition at the fourth line of the table of FIG. 4 is satisfied, and therefore the classification determinator 113 determines a playlist number PL#4 and the item type Type1 as the classification information CLS. If the metadata TextMemo set to "FaceDetection" and "Mr.U" is received by the classification determinator 113 as the recorded metadata RMETA, the classification condition at the fifth line of the table of FIG. 4 is satisfied, and therefore the classification determinator 113 determines a playlist number PL#6 and the item type Type2 as the classification information CLS.

For the recorded metadata RMETA, it is, as just described, sequentially determined whether or not any of the classification conditions is satisfied, and the classification information corresponding to the first-satisfied classification condition is determined as the classification information CLS.

[Playlist Generation Process]

First, the playlist generator 112 provides the classification determinator 113 with the supplied recorded metadata RMETA, and receives the classification information CLS in return. Subsequently, the playlist generator 112 performs the playlist generation process based on the received classification information CLS. The playlist generator 112 performs different types of the playlist generation process according to the item type indicated by the classification information CLS. The item type Type1 is hereinafter referred to as a "first item type," and the item type Type2 is hereinafter referred to as a "second item type." That is, the first item type is set when the metadata attachment target is a shot, whereas the second item type is set when the metadata attachment target is a particular point in video data. Specific examples of the playlist generation processes using such two item types will be described.

Figure 5:
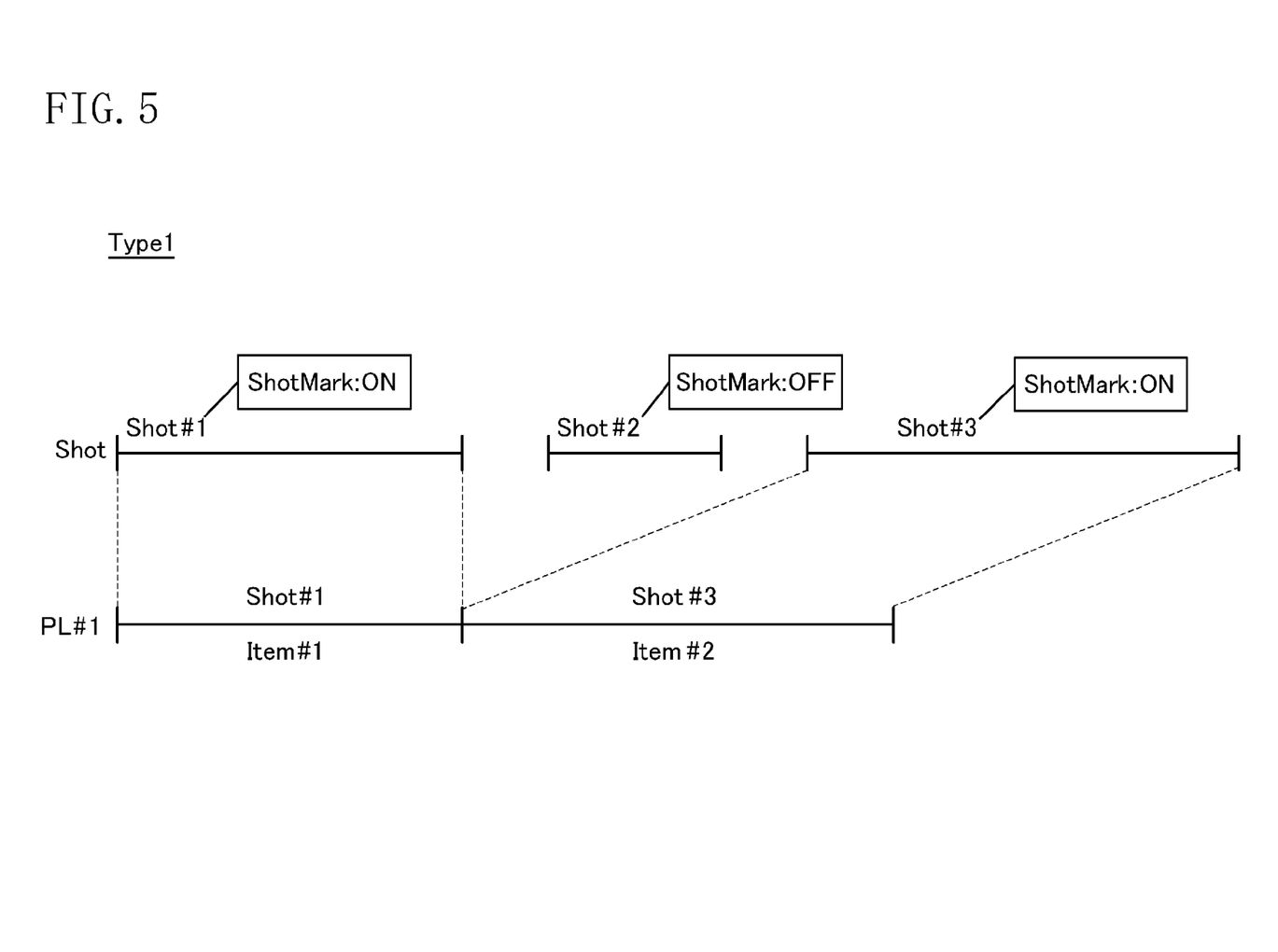
FIG. 5 illustrates an example of a playlist generation process using a first item type.

FIG. 5 illustrates an example of the playlist generation process using the first item type. Referring to FIG. 5, metadata ShotMark is attached to each shot Shot#1, Shot#2, Shot #3, and a playlist PL#1 is generated from the shots whose metadata ShotMark is set to "ON." This corresponds to the first line of the table of the classification rules of FIG. 4. In the example of FIG. 5, the metadata ShotMark of the shots Shot#1, Shot#3 is set to "ON." After the playlist generation process, the playlist PL#1 including, as a play item, the entire section of each of the shots Shot#1, Shot#3 is generated. Note that "Item#1" and "Item#2" in FIG. 5 represent play items of the playlist PL#1. That is, in the example of FIG. 5, "Item#1" corresponds to the entire section of the shot Shot#1, and "Item#2" corresponds to the entire section of the shot Shot#3. In the case of the first item type, the playlist generator 112 may add, as a play item, a predetermined section or an entire section of a shot whose metadata satisfies the classification condition to a corresponding playlist.

Figure 6:
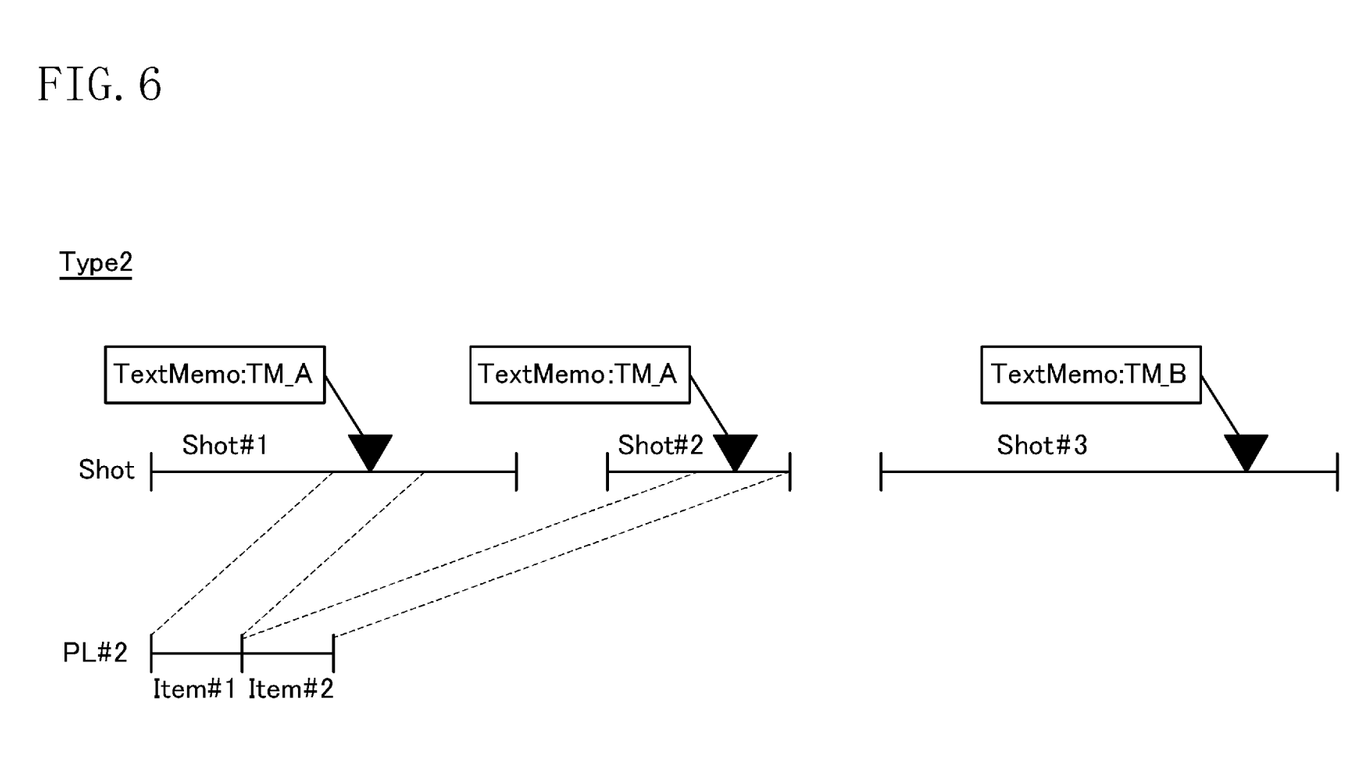
FIG. 6 illustrates an example of a playlist generation process using a second item type.

FIG. 6 illustrates an example of the playlist generation process using the second item type. Referring to FIG. 6, metadata TextMemo is attached to each shot Shot#1, Shot#2, Shot#3, and a playlist PL#2 is generated from the shots whose metadata TextMemo is set to a character string of "TM_A." This corresponds to the second line of the table of the classification rules of FIG. 4. In the example of FIG. 6, the metadata TextMemo set to the character string of "TM_A" is attached to the shots Shot#1, Shot#2. On the other hand, the metadata TextMemo which is not set to the character string of "TM_A" is attached to the shot Shot#3. After the playlist generation process, the playlist PL#2 is generated, which includes, as play items, a section before and after the point of the shot Shot#1 to which the metadata TextMemo is attached and a section before and after the point of the shot Shot#2 to which the metadata TextMemo is attached. For example, a video data section two seconds before and two seconds after the point to which the metadata TextMemo is attached is added as a play item.

Note that "Item#1" and "Item#2" in FIG. 6 represent play items of the playlist PL#2. That is, in the example of FIG. 6, "Item#1" corresponds to a section two seconds before and two seconds after the point of the shot Shot#1 to which the metadata TextMemo set to the character string of "TM_A" is attached, and "Item#2" corresponds to a section two seconds before and two seconds after the point of the shot Shot#2 to which the metadata TextMemo set to the character string of "TM_A" is attached. The example where the section two seconds before and two seconds after the metadata attachment point is added as the play item has been described herein. However, a time interval before or after the metadata attachment point is not necessarily two seconds, and the length of the play item may vary depending on the use and purpose of shooting.

In the case of the second item type, the playlist generator 112 may add, as a play item, part of a section of a shot (i.e., a section before and after a metadata attachment point) to a corresponding playlist.

Even in the case where the first and second item types are applied in a mixed manner, the playlist generation process can be performed by combination of the process for first item type and the process for second item type. Since the process for recording a playlist as a playlist file has been generally widely known, the detailed description thereof will not be made.

Using the classification determination process and the playlist generation process, the metadata ShotMark is, for, e.g., shots taken under good shooting conditions, set to "ON" to generate a playlist of high-quality shots. For, e.g., scenes of a sports game at the moment of goals, the metadata TextMemo is set to "Goal," and classification rules for setting sections before and after "Goal" to a single play list are prepared. In this manner, a digest of goal scenes (i.e., a playlist with which the recorded metadata set to "Goal" is associated) can be automatically generated upon shooting.

In the present embodiment, an association between recorded metadata and a playlist is established to easily perform a classification process using the playlist and easily provide a user with the playlist.

For example, if recorded metadata TextMemo set to "Goal" is attached to each goal scene of a sports game, video data sections each associated with such recorded metadata can be collected to form a digest of goal scenes. In this case, the camera recorder 1 performs the foregoing process to automatically perform classification using a playlist based on input of "Goal" of the recorded metadata TextMemo. As long as the value ("Goal") of the recorded metadata can be associated with the playlist, a user uses a reproduction device for playlist reproduction to select the playlist associated with "Goal" and to easily reproduce the digest of goal scenes.

Recorded metadata and a playlist can be associated with each other in such a manner that, e.g., the name of a metadata item is recorded on the playlist. Referring to, e.g., FIG. 3, the name (e.g., "Goal") of the metadata item may be recorded in the area of "<PlayList>." In order to provide a user with such a name, the name of the metadata item in the area of "<PlayList>" may be displayed on, e.g., a display monitor (not shown in the figure). This is important for user's recognition of a classification status and classification results. Note that examples of other method for establishing an association include a method using the name of a metadata item as the name of a playlist file.

[Metadata Recording Process]

The recorder 102 records the video data after establishment of an association between the supplied recorded metadata RMETA and the video data. For example, the recorder 102 records, together with the video data, the management information file containing the recorded metadata RMETA as illustrated in FIG. 2 and the playlist file indicating the playlist PLST as illustrated in FIG. 3 on the recording medium 103.

An association between the management information file and the video file is established in such a manner that the same file name is set for the management information file and the video file. For example, in the case where the name of the video file is "0000.mxf," the recorder 102 may set the name of the management information file as "0000.text." Thus, the association can be established using part of the name excluding an extension. Note that the association may be established in such a manner that the name of the video file is recorded on the management information file.

The example where the video data is classified using the playlist has been described. Note that information indicating the classification status of video data may be held using a format other than the playlist. However, recording of the playlist on the recording medium 103 brings about, e.g., the following advantage. The recording medium 103 can be handed over to another user so that the same video data contained in the playlist can be reproduced among different users, and time and effort required for re-classification can be eliminated.

[1-3. Advantages]

As described above, in the signal recording apparatus of the present embodiment, the metadata generator 111 generates the recorded metadata RMETA which is the metadata recorded with the AV signal. The classification determinator 113 determines, upon receipt of the recorded metadata RMETA, which playlist a portion of the AV signal corresponding to the recorded metadata RMETA is classified into by referring to the classification database 113a configured to store the classification rules, and outputs the classification information CLS indicating the determination result. The playlist generator 112 generates, based on the classification information CLS, the playlist PLST for AV signal. The recorder 102 records the AV signal, the recorded metadata RMETA, and the playlist PLST on the recording medium 103.

The camera 100 images an object to provide the signal recording apparatus with the video signal and the imaging information on conditions for forming the object image corresponding to the video signal. The metadata generator 111 generates the recorded metadata RMETA using the imaging information received as the metadata META.

The recorder 102 can classify the AV signal into the playlist PLST according to the recorded metadata RMETA and record the classified AV signal.

In the case where the camera 100 outputs the audio signal, the process similar to the foregoing process may be performed.

In such a case, the feature extractor 101 extracts an audio feature such as a change in sound volume of the audio signal (i.e., sound input start and sound input end) to provide the metadata generator 111 with the feature information indicating the extraction result as the metadata META. The sound input start means that the sound volume level of the audio signal changes from a low level to a high level. The sound input start can be extracted by detecting that the sound volume every certain period of time changes from a low level to a high level. Contrary to the sound input start, the sound input end means that the sound volume level of the audio signal changes from a high level to a low level. The sound input end can be extracted by detecting that the sound volume every certain period of time changes from a high level to a low level. Since the process for extracting a feature of an audio signal has been generally widely known, the detailed description thereof will not be made.

The feature information output from the feature extractor 101 is, as the recorded metadata RMETA, provided to the playlist generator 112 via the metadata generator 111. The playlist generator 112 uses the classification determinator 113 to generate the playlist for audio signal. The classification determinator 113 determines the classification information CLS based on the recorded metadata RMETA and the classification rules stored on the classification database 113a.

Figure 7:
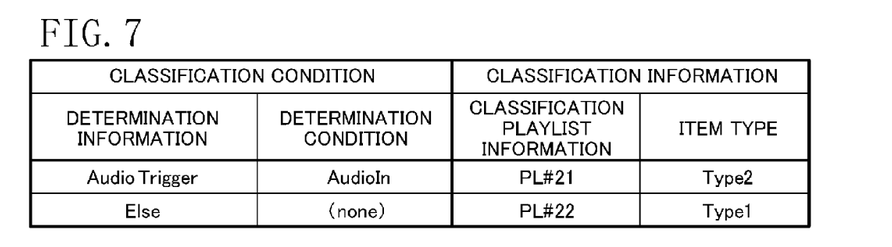
FIG. 7 illustrates an example of the classification rules in the case where an audio feature is used.

FIG. 7 illustrates an example of the classification rules in the case where the audio feature is used. Referring to FIG. 7, "AudioTrigger" is metadata indicating that the sound volume level changes. For example, "AudioIn" indicating the sound input start and "AudioOut" indicating the sound input end can be set for the metadata AudioTrigger. When the recorded metadata is "AudioTrigger" set to "AudioIn," the classification determinator 113 adds, as a play item, an audio data section before and after an attachment point of the recorded metadata to a playlist PL#21 according to a classification rule at the first line of the table of FIG. 7. Such a playlist generation process is similar to the process described above.

Figure 8A:
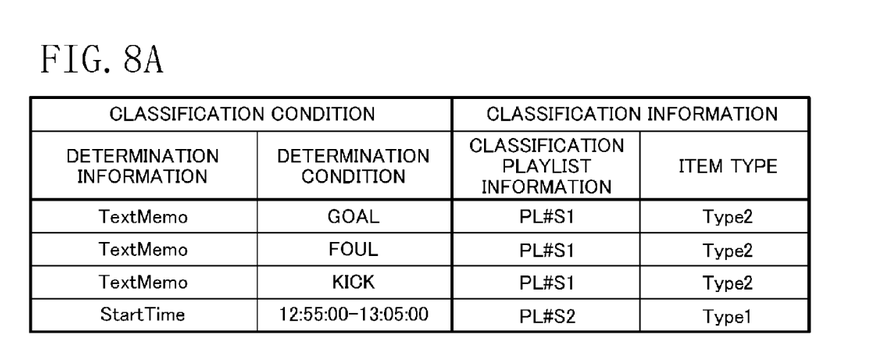
FIGS. 8A and 8B illustrate another example of the classification rules.
Figure 8B:
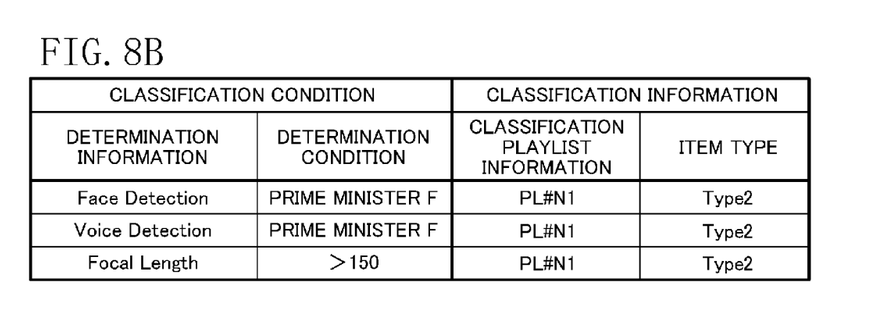

The classification rules of the present embodiment are not limited to those described above, and various classification rules may be used depending on, e.g., an intended purpose. FIGS. 8A and 8B illustrate other examples of the classification rules. FIG. 8A illustrates classification rules intended for collection of highlighted scenes of a football game. If metadata TextMemo set to "Goal," "Foul," or "Kick" is attached, a data section before and after an attachment point of such metadata is collected to a playlist PL#S1. Moreover, since a kickoff time is 13:00 (i.e., 1:00 pm), a shot to which metadata StartTime set to any point between 12:55 and 13:05 (i.e., 1:05 pm) is attached is collected to a playlist PL#S2. FIG. 8B illustrates classification rules intended for collection of video pictures of the prime minister for political coverage. If metadata TextMemo set to a combination of "FaceDetection" and "Prime Minister F" or a combination of "VoiceDetection" and "Prime Minister F" is attached, a data section before and after an attachment point of such metadata is collected to a playlist PL#N1. Note that "VoiceDetection" is a name (i.e., a tag) indicating that the metadata TextMemo is information on voice detection result. If metadata FocalLength set to ">150" (i.e., exceeding a value of 150) is attached, it indicates that a video picture is in a zoom-in state, and therefore a data section before and after an attachment point of the metadata FocalLength is collected to the playlist PL#N1.

Second Embodiment

A second embodiment will be described below with reference to FIG. 9.

[2-1. Configuration]

Figure 9:
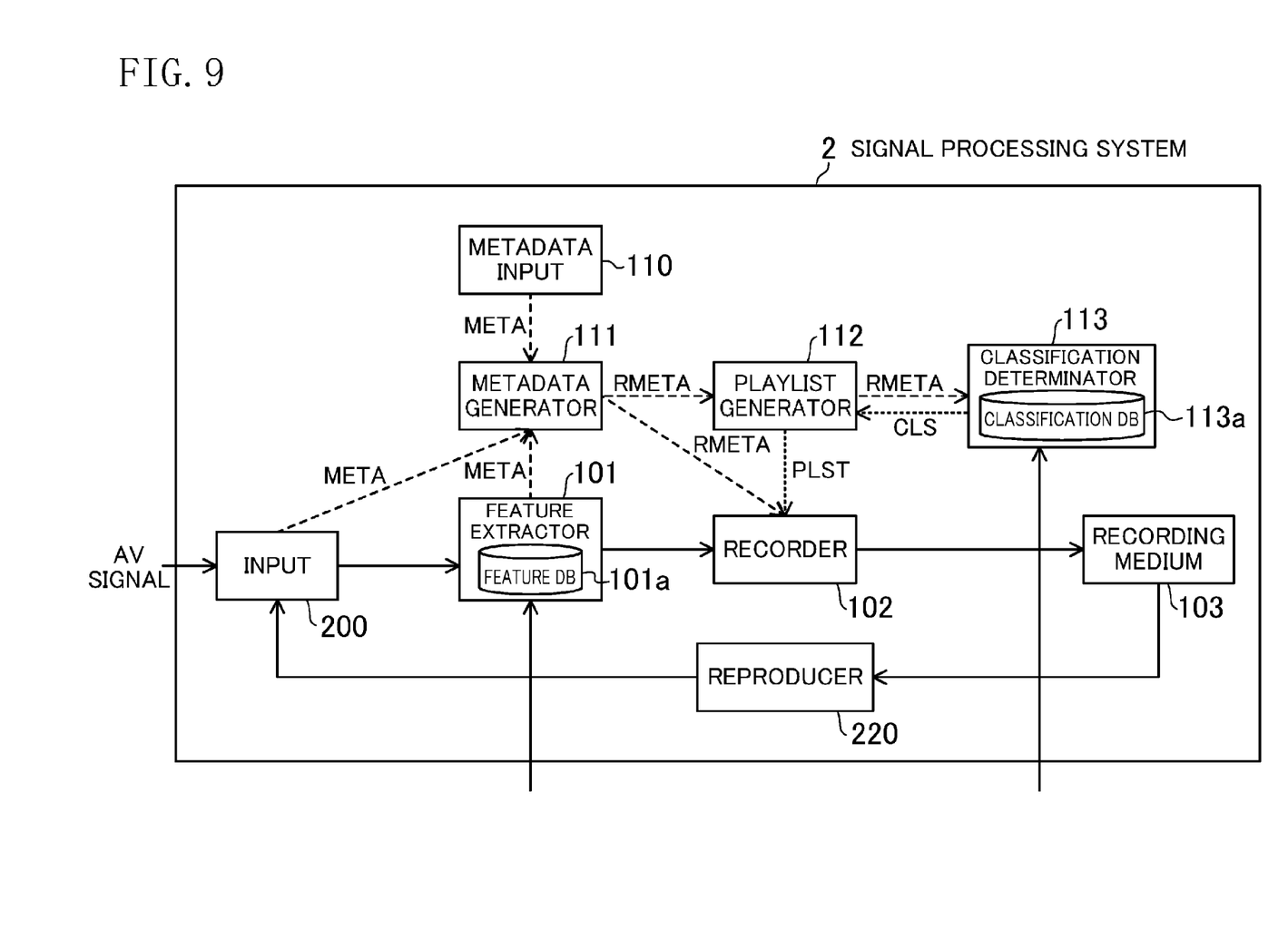
FIG. 9 is a block diagram illustrating a configuration of a signal processing system of a second embodiment.

FIG. 9 is a block diagram illustrating a configuration of a signal processing system of the second embodiment. A signal processing system 2 illustrated in FIG. 9 includes, as in the camera recorder 1 illustrated in FIG. 1, a feature extractor 101, a recorder 102, a recording medium 103, a metadata input 110, a metadata generator 111, a playlist generator 112, and a classification determinator 113. The signal processing system 2 further includes an input 200 and a reproducer 220.

The input 200 is configured to receive an AV signal from the outside of the signal processing system 2 to input the AV signal to the feature extractor 101. For example, the input 200 may be configured to input an AV signal using a high definition serial digital interface (HD-SDI) generally used for business purposes and standardized as SMPTE-292M.

The reproducer 220 is configured to reproduce AV data of the recording medium 103. For example, the reproducer 220 reads AV data recorded on the recording medium 103 as an AV file to decode the AV data, and outputs the decoded AV data as an AV signal. The signal processing system 2 is configured such that the AV signal output from the reproducer 220 can be input to the input 200.

[2-2. Processing]

As in the camera recorder 1 of the first embodiment, the signal processing system 2 records the input AV signal on the recording medium 103 according to a user's recording start/end instruction. The input 200 provides the feature extractor 101 with the input AV signal. A subsequent process may be similar to that of the first embodiment. Such a process allows the signal processing system 2 to classify the input AV signal using a playlist.

The reproducer 220 starts/ends, according to a user's reproduction start/end instruction, reading and decoding of the AV data recorded on the recording medium 103. Since the process for reproducing a signal has been generally widely known, the detailed description thereof will not be made. The reproducer 220 provides the input 200 with the reproduced AV signal. According to this configuration, a playlist can be recorded on the recording medium 103. Thus, the signal processing system 2 is capable of performing, for an AV data aggregate recorded on the recording medium 103, classification using the playlist.

[2-3. Advantages]

As described above, in the signal recording apparatus of the present embodiment, the metadata generator 111 generates recorded metadata RMETA which is metadata recorded with the AV signal. The classification determinator 113 determines, upon receipt of the recorded metadata RMETA, which playlist a portion of the AV signal corresponding to the recorded metadata RMETA is classified into by referring to a classification database 113a configured to store classification rules, and outputs classification information CLS indicating a determination result. The playlist generator 112 generates, based on the classification information CLS, a playlist PLST for AV signal. The recorder 102 records the AV signal, the recorded metadata RMETA, and the playlist PLST on the recording medium 103.

The reproducer 220 reproduces the AV signal from the recording medium 103. The input 200 provides the signal recording apparatus with the AV signal reproduced by the reproducer 220.

According to the foregoing, the signal processing system 2 is capable of classifying materials (i.e., video data and audio data) recorded on the recording medium 103 into the playlists PLST according to the recorded metadata RMETA and recording the materials.

Other Embodiments

As described above, the first and second embodiments have been described as example techniques disclosed in the present application. However, the techniques according to the present disclosure are not limited to these embodiments, but are also applicable to those where modifications, substitutions, additions, and omissions are made. In addition, elements described in the first and second embodiments may be combined to provide a different embodiment.

Other example embodiments will be described below.

In the first embodiment, the text file in the CSV format and the text file using the tag have been described as examples of the management information file. As long as metadata associated with video data or audio data can be recorded, any file formats can be employed. Thus, the present disclosure is not limited to the management information file in the CSV format and the text file using the tag. For example, metadata may be recorded using an extensible markup language (XML) format which is one of markup languages.

In the second embodiment, the example where an AV signal is reproduced from the recording medium 103 has been described as an example of the configuration of the signal processing system 2. The recording medium 103 may be separated into a recording medium which is for recording, and a recording medium which is for reproduction and which is configured to store AV data to be reproduced. In this case, the recorder 102 may record an AV signal on the recording medium for recording, and may reproduce an AV signal from the recording medium for reproduction. Thus, a destination to which the reproducer 220 is connected is not limited to the recording medium 103. Note that, in the case where the common recoding medium is accessed, it is easier for a user to handle the recording medium.

An AV signal and a playlist may be recorded on another recording medium.

In the second embodiment, it has been described that the input 200 is configured to input a video/audio signal. The input 200 may be configured to input only a video signal, or may be configured to input only an audio signal.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is useful for automatically classifying, in a signal recording apparatus configured to record an AV signal, video/sound materials with a reduced operational burden. Specifically, the present disclosure is applicable to, e.g., camera recorders, camcorders, mobile phones with camera functions, smart phones, and video/audio signal recording and reproducing apparatuses.

What is claimed is:

1. A signal recording apparatus for recording an AV signal containing at least one of video or audio, comprising:
   a camera configured to form an object image to provide a video signal of the object image and setting information of the camera;
   a metadata generator configured to generate recorded metadata which is metadata recorded with the AV signal;
   a classification determinator configured to determine, upon receipt of the recorded metadata, which playlist a portion of the AV signal corresponding to the recorded metadata is classified into by referring to a classification database storing a classification rule and to output classification information indicating a determination result, the classification rule being a rule used for determining the classification information based on the recorded metadata;
   a playlist generator configured to generate, according to the classification information, a playlist for the AV signal; and
   a recorder configured to record the AV signal, the recorded metadata, and the playlist on at least one recording medium,
   wherein the metadata generator generates the recorded metadata using the setting information of the camera,
   the classification rule includes a plurality of classification conditions and a plurality of classification information items, the plurality of classification conditions each corresponding to one of the plurality of classification information items, the plurality of classification information items each including an identifier of a different playlist,
   the plurality of classification conditions include a classification condition using the setting information of the camera, and
   the classification determinator outputs as the classification information, the classification information item corresponding to a first classification condition among the plurality of classification conditions when the recorded metadata satisfies the first classification condition while not satisfying another of the plurality of classification conditions.

2. The signal recording apparatus of claim 1, wherein the classification rule stored on the classification database is updatable from outside of the signal recording apparatus.

3. The signal recording apparatus of claim 1, further comprising:
   a feature extractor configured to determine whether or not the video or the audio contained in the AV signal contains a predetermined feature and to provide the metadata generator with feature information specifying the predetermined feature and a portion of the AV signal containing the predetermined feature,
   wherein the metadata generator generates the recorded metadata using the feature information.

4. The signal recording apparatus of claim 3, wherein the feature extractor determines whether or not the video contained in the AV signal contains a face image of a predetermined person or whether or not the audio contained in the AV signal contains sound of a voice of the predetermined person.

5. The signal recording apparatus of claim 3, wherein the feature extractor includes a feature database configured to store reference feature data used for comparison with the video or the audio contained in the AV signal, and
   the reference feature data stored on the feature database is updatable from outside of the signal recording apparatus.

6. The signal recording apparatus of claim 1, wherein the playlist generator generates a playlist containing, as a play item, a predetermined section or an entire section of a shot to which the recorded metadata is attached.

7. The signal recording apparatus of claim 1, wherein the playlist generator generates a playlist containing, as a play item, a section of a shot before and after a point to which the recorded metadata is attached.

8. A signal processing system comprising:
   the signal recording apparatus of claim 1;
   a reproducer configured to reproduce an AV signal from the at least one recording medium; and
   an input configured to provide the signal recording apparatus with the AV signal reproduced by the reproducer.

9. The signal recording apparatus of claim 1, wherein the first classification condition is associated with a parameter that is independent from a parameter of another of the plurality of classification conditions, the respective parameters relating to different characteristics of the AV signal.

* * * * *